United States Patent [19]
Houston

[11] 3,778,757
[45] Dec. 11, 1973

[54] METHOD AND APPARATUS FOR VISUAL IMAGING ULTRASONIC ECHO SIGNALS UTILIZING MULTIPLE TRANSMITTERS FOR REDUCED SPECULAR REFLECTION EFFECTS

[75] Inventor: John M. Houston, Schenectady, N.Y.

[73] Assignee: General Electric Company, Schenectady, N.Y.

[22] Filed: Sept. 1, 1972

[21] Appl. No.: 285,913

[52] U.S. Cl. .............................. 340/5 MP, 73/67.7
[51] Int. Cl. .............................................. G01s 9/66
[58] Field of Search ................. 340/1 R, 3 R, 5 MP, 340/5 H; 73/67.7

[56] References Cited
UNITED STATES PATENTS
3,548,642  12/1970  Flaherty et al. .............. 340/5 MP X Primary Examiner—Richard A. Farley
Attorney—John F. Ahern et al.

[57] ABSTRACT

Visual image conversion of ultrasonic echo signals utilizes a plurality of acoustic transmitters oriented at different angles about an object being examined for reducing the effects of specular reflection. The transmitters are separately pulsed for sequentially generating ultrasonic signals directed at the object. An acoustic lens or reflector images object-reflected ultrasonic signals (echoes) onto a single row of acoustic detectors associated with the centrally-most oriented transmitter and such echo signals resulting from each sequentially incident ultrasonic signal are stored in a memory component associated with the detectors. Controls are provided for echo timing compensation due to unequal distances between the transmitters and center of the object, and also due to the particular angles of each off-axis transmitter from the centerline axis of the apparatus. The memory is subsequently read out sequentially for visually displaying the stored ultrasonic echo signals on a line-by-line basis on a conventional cathode ray tube or other serial input visual display device. Alternatively, no memory is required and the echo signals are displayed more rapidly on a multibeam cathode ray tube or other parallel input visual display device. The sequence can be repeated many times a second permitting display of motion of the object.

39 Claims, 11 Drawing Figures

METHOD AND APPARATUS FOR VISUAL IMAGING ULTRASONIC ECHO SIGNALS UTILIZING MULTIPLE TRANSMITTERS FOR REDUCED SPECULAR REFLECTION EFFECTS

My invention relates to a method and apparatus deriving a motion picture type visual display of the interior of objects such as biological organs, and in particular, to an apparatus for rapidly converting ultrasonic signals reflected from the particular object wherein the incident ultrasonic signals are generated from multiple acoustic transmitters.

Visual image conversion of ultrasonic echo signals is used in medical diagnostics in the examination of biological tissues and organs, and in industry in the inspection of manufactured objects for internal flaws as two typical examples. Prior to my invention, ultrasonic inspection was performed by mechanically scanning a single narrow beam quartz crystal (transmitter) along a line lying parallel to the surface of the object to be examined. The crystal may be pulsed approximately 100 times per second, and after each pulse the crystal also functions as a piezoelectric detector for detecting the object-reflected ultrasonic echoes which are displayed versus time on one line of a cathode ray tube display. As the crystal is mechanically scanned along the line, the cathode ray tube display progresses from line to line thereby forming an entire image (frame) in a few seconds, e.g., a 500 line image would take five seconds to produce at 100 pulses per second, which several second process makes it impossible to obtain a visual display with any reasonable resolution of an object undergoing motion such as the beating of a human heart.

A recent improvement in the field of visual image conversion of ultrasonic echo signals is disclosed in a copending patent application Ser. No. 156,226 entitled "Ultrasonic Inspection Apparatus," inventor Henry A.F. Rocha, filed June 24, 1971, now abandoned, in favor of a continuation application Ser. No. 290,253 filed Sept. 18, 1972, and assigned to the assignee of the present invention. The Rocha apparatus utilizes a planar array of $n^2$ acoustic detectors each associated with a light emitting element to produce a visual display of an planar slice of the object being examined which plane lies parallel to the planar array of acoustic detectors. In contradistinction, my invention utilizes only $n$ acoustic detectors arranged in a single row and provides a visual display of a planar slice of the object being examined which lies in a plane defined by the apparatus centerline axis and the axis of the acoustic detectors, that is, when both arrays of the detectors are positioned directly in front of the object to be examined, Rocha's display is a planar slice parallel to the front of the body whereas my display is a planar slice normal thereto.

A concurrently filed patent application Ser. No. 285,910 entitled "Method and Apparatus for Visual Imaging of Ultrasonic Echo Signals Utilizing a Single Transmitter," inventors John M. Houston and Jack D, Kingsley, and assigned to the assignee of the present invention, is directed to an apparatus of the type described in my present application, but utilizing only a single acoustic transmitter instead of my plurality of transmitters. A problem affecting all medical diagnostic ultrasonic imaging systems is the fact that many organs and tissues in the human body tend to be smooth compared to the ultrasonic wavelength and, therefore, any ultrasonic energy incident on the organ or tissue at an angle other than 90° results in specular reflection with little energy reflected back to the acoustic detector. Consequently, the use of only a single acoustic transmitter may result in obtaining a visual display of only those surfaces which are nearly normal to the system axis.

Therefore, one of the principal objects of my invention is to provide an improved method and apparatus for ultrasonic imaging having reduced specular reflection effects.

Another object of my invention is to provide an improved method and apparatus for visual imaging of ultrasonic signals.

A further object of my invention is to provide a method and apparatus for producing the visual imaging at a sufficiently fast rate for viewing motion of the object being examined.

A still further object of my invention is to provide a visual display of an ultrasonic image of a planar slice through an object being examined.

Another object of my invention is to obtain the visual display after the echo signals have been delayed by temporary storage in a memory.

Another object of my invention is to obtain a high resolution optical display which can be directly and continuously observed.

Briefly stated, my invention is a method and apparatus for providing a visual display of ultrasonic signals reflected from a planar slice through an object being examined. A plurality of acoustic transmitters are oriented at different angles about the object and are controlled for sequentially generating ultrasonic wave energy in a liquid medium and directed at the object from a plurality of directions. A plurality of acoustic detectors are arranged in a single row along an axis perpendicular to the centerline axis of the apparatus for simultaneously detecting ultrasonic signals reflected from the object and its internal acoustic heterogeneities in response to each incident signal. An acoustic lens or reflector is utilized for imaging the echo signals onto the acoustic detectors and in one embodiment, reflectors may additionally be associated with each transmitter for directing the generated signals toward the object. The outputs of the detectors are connected to amplifiers which are gated on and off at desired times corresponding to the depth of field in the object being examined. A cathode ray tube or other visual display means is connected to the outputs of the amplifiers for providing the visual display of the echo signals, each sweep line on the cathode ray tube display being associated with a corresponding acoustic detector. The visual display represents a planar slice of the object lying in a plane defined by the centerline axis of the apparatus and the axis of the acoustic detectors. Controls are provided for echo timing compensation due to the use of differently oriented transmitters. Separately adjustable sweep speeds for the visual display means compensate for the different times of arrival at the detectors of echo signals from two different points in the object as a function of the angles of the transmitters. Separately adjustable time delays provided between the transmitters and sequencer for operation thereof compensate for unequal distances of the transmitters from the object center.

In one embodiment, the outputs of the amplifiers are supplied to a suitable memory which is subsequently sequentially read out on a line-to-line basis on a conventional cathode ray tube for providing a slightly delayed visual display thereon. In a second embodiment, the outputs of the amplifiers are connected directly to the inputs of a multi-beam cathode ray tube or other parallel input visual display means for providing a more rapid visual display of the ultrasonic echo signals. The frequency of periodic transmitter pulsing is sufficiently rapid, and the various signals are of sufficiently short duration such that the sequence of operation of my apparatus may be repeated rapidly thereby permitting a visual display of motion of the object being examined such as the beating of a human heart in the case of an internal medical diagnostic examination.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
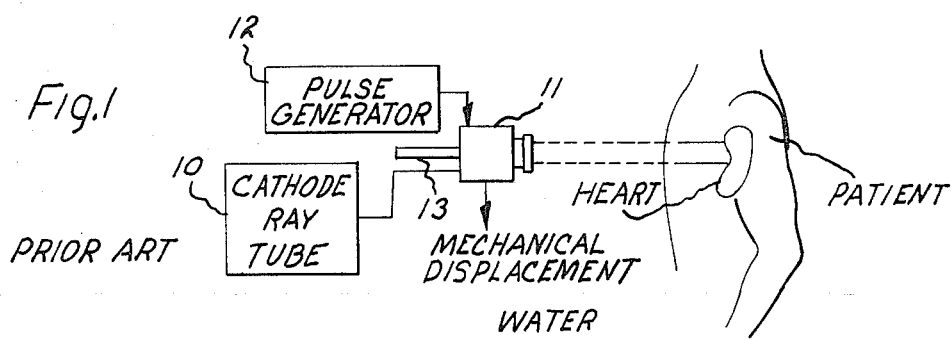
FIG. 1 is a side view of a simplified prior art apparatus for mechanically scanning a single acoustic transmitter along a line parallel to the front of a patient in a medical diagnostic application of ultrasonic imaging.

Referring now to FIG. 1, there is shown a prior art apparatus for obtaining a visual display of ultrasonic images on a conventional cathode ray tube (CRT) 10. As used herein, the term "cathode ray tube" will be meant to include the display tube and all of the electronic circuitry associated with the tube such as the sweep generator, etc. The display depicted on the screen of tube 10 is illustrated in dotted form in FIG. 2. The prior art ultrasonic image is obtained by mechanically scanning a single narrow-beam quartz crystal piezoelectric transducer 11 along a line parallel to the surface of the object being examined. In the particular application illustrated in FIG. 1, the object is a patient having an internal organ such as the heart being examined by ultrasonic imaging. It should be understood that the object being examined need not be of the biological type and may be an article of manufacture being examined for internal flaws or acoustic heterogeneties. By acoustic heterogeneity is meant a discontinuity or separation surface between two media having different acoustic impedances. It should be noted that both in the prior art and the present invention, the ultrasonic transducer transmitters, receivers and object being examined are positioned within a suitable liquid medium such as water for more efficient transmission of the incident and reflected ultrasonic signals. As depicted in FIG. 1, piezoelectric transducer 11 is mechanically scanned along a vertical line lying parallel to the front surface of the patient, the line being of sufficient height to obtain ultrasonic irradiation of the entire heart. This mechanical scanning or displacement of transducer 11 in the vertical direction as depicted in FIG. 1 can be achieved in any suitable manner such as by mounting transducer 11 on a vertically oriented track. The crystal of transducer 11 is pulsed from a suitable electrical pulse source 12 at approximately 100 times per second, and after each pulse, transducer 11 also functions as a piezoelectric detector for detecting the ultrasonic wave energy echoes reflected from the object being examined. After each pulse, the echo signal is displayed versus time one sweep line of the CRT 10 and as the transducer 11 is mechanically displaced along its track, the CRT display progresses from line to line, thereby forming the entire image of the object within a few seconds, in the case of a 500 line image the process requiring 5 seconds for a crystal pulsing rate of 100 times per second. The piezoelectric transducer 11 can be mechanically displaced by any suitable means such as a motor-driven member 13 connected to transducer 11. Since this prior art ultrasonic scanner requires approximately 5 seconds to form each complete image (frame), it is obvious that the visual display of motion of the object, that is, a display of a type similar to a conventional television image, is not possible.

Figure 2:
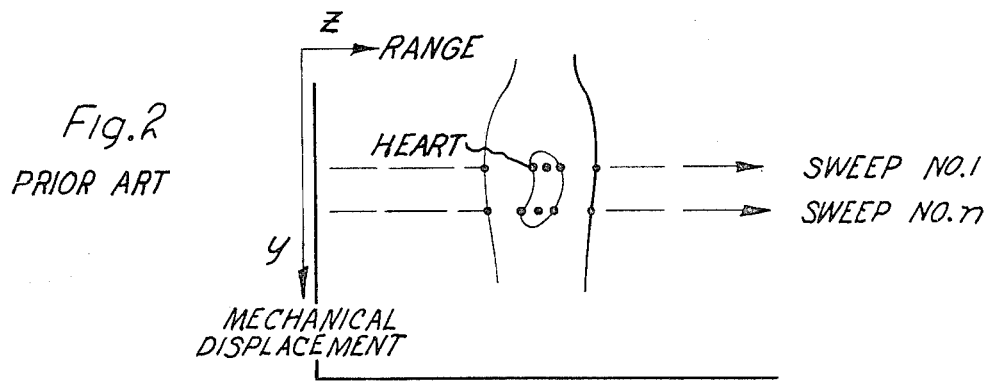
FIG. 2 is a typical cathode ray tube display of the reflected ultrasonic signals versus range obtained from the apparatus illustrated in FIG. 1.

The type of visual display formed on the screen of the CRT 10 is depicted in FIG. 2 wherein the abscissa (Z axis) is in terms of the range from transducer 11 (i.e., a time function) and the ordinate (y axis) is in terms of the mechanical displacement of the transducer. Thus, each horizontal sweep line represents the scan developed by a pulse (or burst of pulses) generated in pulse source 12 and each detected echo signal is depicted as a dot of light (i.e., intensity modulation of the CRT electron beam) along the sweep line and represents the range from the transducer to an acoustic heterogeneity. Transducer 11 is moved vertically (in the FIG. 1 view) at a sufficiently slow rate to obtain close spacing of adjacent sweep lines on the CRT display and thereby obtain a visual display having a relatively high resolution for objects which are substantially completely stationary.

Figure 3:
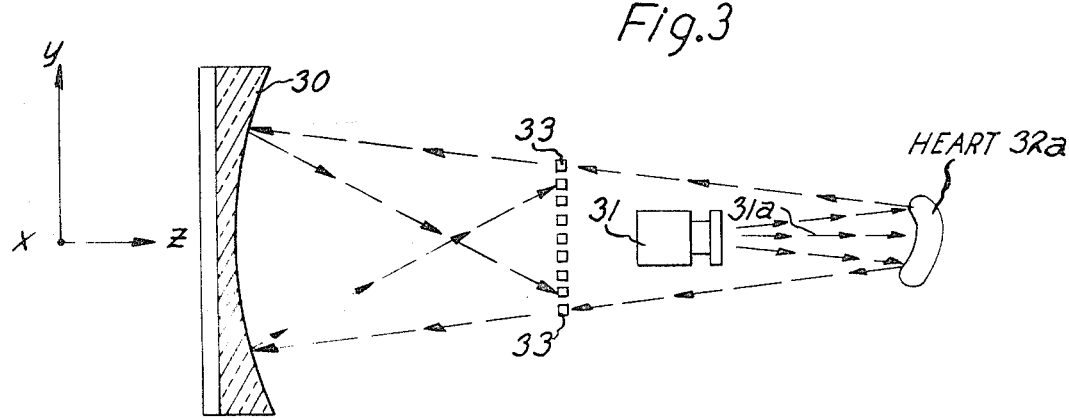
FIG. 3 is a side view electrical the ultrasonic imaging components of the single-transmitter invention disclosed in concurrently filed application Ser. No. 285,910.

Referring now to FIG. 3, there is shown the ultrasonic imaging component portion of the invention disclosed and claimed in the above-referenced application Ser. No. 285,910 wherein an acoustic imaging or focussing means in the form of concave acoustic reflector 30 is utilized for receiving ultrasonic reflections from the object 32. Reflector 30 focusses the echo signals upon a single row of acoustic detectors 33 which is spaced from reflector 30. A single acoustic transmitter 31 is positioned between detectors 33 and the object 32 being examined, in this particular case the object being the heart 32a of a human patient, in a liquid medium contained within a tank in which are immersed reflector 30, transmitter 31, patient 32 and the single row of acoustic detectors 33.

The single row of acoustic detectors 33 is arranged in a striaght line along an axis perpendicular to the centerline axis of the apparatus and the detectors are simultaneously responsive to the ultrasonic echo signals arriving from various depths within heart 32a. The visual image formed on a cathode ray tube (or other suitable visual display device) from the outputs of detectors 33 is a planar slice through object 32a in a plane defined by the centerline axis 31a of the apparatus and the axis formed by the straight line along which acoustic detectors 33 are arranged. Thus, as depicted in FIG. 3, the image of heart 32a as detected by a single vertical row of detectors 33 is a vertical planar slice through heart 32a from the front to the back thereof assuming that the patient is facing transmitter 31.

Figure 4:
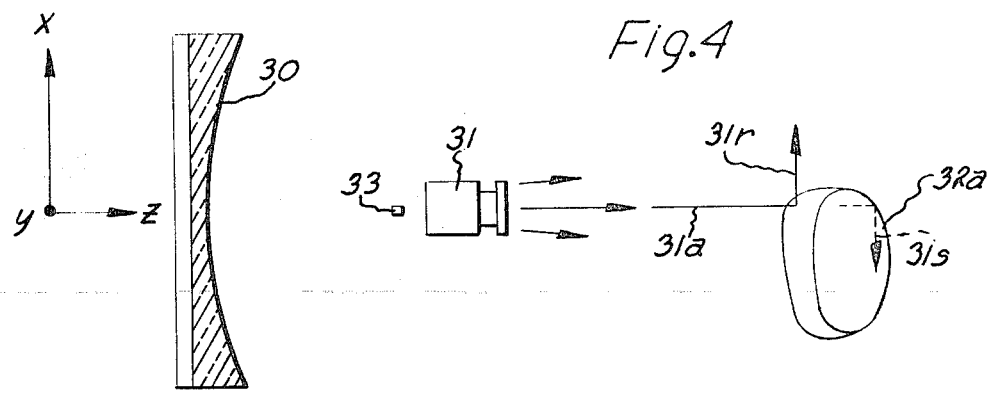
in FIG. 4 is a top view of the apparatus illustrated in FIG. 3 and indicating the specular reflections from the object being examined.

FIG. 4 is a top view of the ultrasonic imaging components illustrated in FIG. 3, and illustrates the problem described hereinabove which affects all medical ultrasonic imaging systems, namely, the fact that the smoothness of many body organs and tissue compared to the ultrasonic wavelength of 1 millimeter as a typical example, results in a specular reflection of the ultrasonic energy which is incident on the organ at an angle other than normal to the apparatus axis. Thus, the ultrasonic energy depicted in FIG. 4 as being incident on an upper portion of heart 32a results in the specular reflections 31r and 31s shown directed at approximately 90° from the apparatus axis 31a, and thus being lost as far as the single row of detectors 33 is concerned. The consequences of not being able to image portions of body organs which have surfaces considerably off normal to the apparatus axis is readily apparent, and is a primary reason for my invention to be described hereinafter. The top view of FIG. 4 illustrates the components as being located in what herein is defined as the X-Z plane as distinguished from the side view of Y-Z plane of FIGS. 1-3, and the single row of detectors 33 thus appear as only one detector in FIG. 4.

Figure 5:
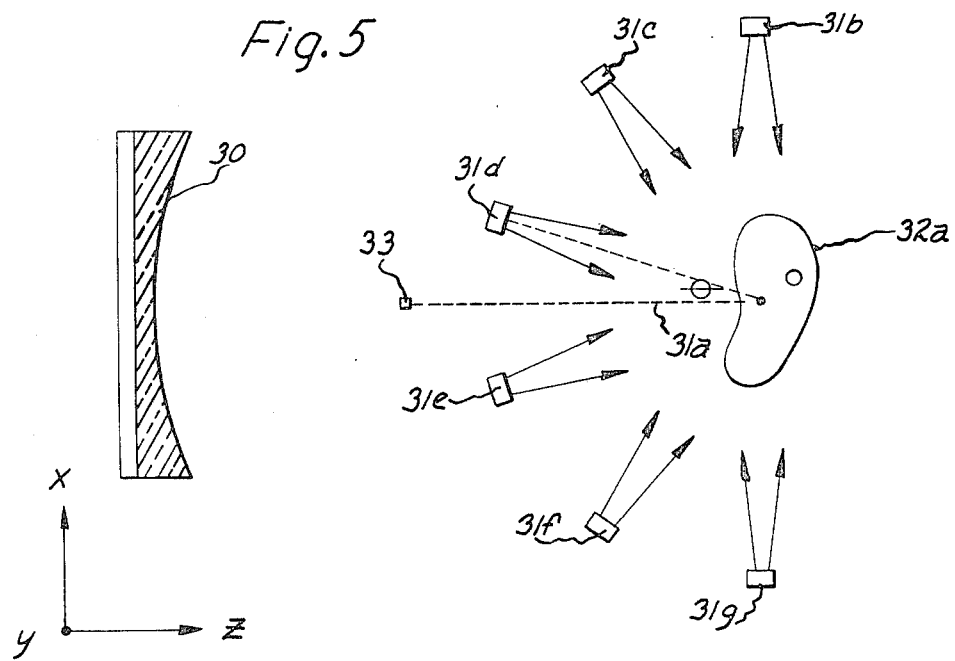
FIG. 5 is a top view of a first embodiment of the ultrasonic imaging components of my multi-transmitter invention.

Referring now to FIG. 5, there is shown a top view of a first embodiment of the ultrasonic imaging component portion of my invention wherein a plurality (six in this example) of acoustic transmitters 31b–g are oriented in the X-Z plane. The X-Z plane also contains the apparatus center-line axis 31a which is defined by the center-line axis of a single acoustic reflector 30 and the center of a single row of acoustic detectors 33 (the center-most detector in the case of an odd number of detectors). The transmitters are distributed along approximately a 180° arc about the object 32a being examined although as will be described with reference to FIG. 10, the transmitters need not extend ±90° about object 32a, and can extend to lesser angles such as 60° or ±45°. In the case of an odd number of transmitters, the centrally oriented transmitter is generally aligned with the apparatus center-line axis, although this is not a requirement. The single row of acoustic detectors 33 is arranged in a straight line along an axis perpendicular both to the apparatus centerline axis 31a and to the X-Z plane. The detectors are preferably equally spaced apart and are simultaneously responsive to the ultrasonic echo signals arriving from various depths within heart 32a. The single acoustic reflector 30 focusses or images the echo signals returned from object 32a onto the single row of detectors 33. Reflector 30 is formed of a suitable metal such as steel and is provided with the desired concave curved surface. The single row of detectors 33 is spaced from reflector 30 typically a distance of approximately 1.5 times the focal length of the reflector which is also established as the midpoint between reflector 30 and object 32a such that the ultrasonic object imaged upon detectors 33 after reflection off reflector 30 is one-half the height of the actual object. In such case, the single row of detectors 33 have an over-all length dimension (in the y axis direction) substantially smaller than the height of heart 32a.

The plurality of acoustic transmitters 31b–31g are located on the 180° arc passing between detectors 33 and the object 32a being examined, and the transmitters' ultrasonic outputs are directed one (or two in the case of symmetrically oriented transmitters) at a time toward the patient as in FIG. 3. The acoustic transmitters are preferably (but not necessarily) equally spaced apart and are conventional acoustic transducers, each of which, for example, may include a piezoelectric crystal for converting electrical exciting waves (supplied to the crystal from a suitable electrical source to be described hereinafter) into equivalent acoustic or ultrasonic energy waves in the liquid medium contained within a tank in which are immersed reflector 30, transmitters 31, patient 32, and the single row of acoustic detectors 33. The tank which contains the liquid medium, such as water, is conveniently of a size such that the patient 32 is positioned at one end of the tank and the reflector 30 is positioned near or at the second end thereof. Acoustic detectors 33 may be described as ultrasonic image converters for converting a spatial distribution of the pressure of the reflected ultrasonic energy waves received at the inputs thereof into corresponding electrical voltage signals at the outputs thereof. Detectors 33 are also conventional acoustic transducers which may comprise piezoelectric crystals. The piezoelectric material utilized in the acoustic transmitters and detectors may be lead-zirconium-titinate, as one example.

The visual image formed on a cathode ray tube (or other suitable visual display device) from the outputs of detectors 33 (in a manner to be described hereinafter) is a planar slice through object 32a in a plane defined by the apparatus axis 31a and the axis formed by the line along which acoustic detectors 33 are arranged in a single row as in FIG. 3. As distinguished from the narrow beam output of acoustic transmitter 11 utilized in the prior art ultrasonic imaging system described with reference to FIG. 1, the ultrasonic pressure wave front pattern developed by each of my transmitters is sufficiently broad to illuminate the entire object being examined. Thus, in the case of a medical examination of a human heart 32a, the apertures of transmitters 31b–g and spacing of the transmitters from the patient are selected to obtain ultrasonic irradiation of the entire heart by the pulsed ultrasonic signals emitted from the transmitters. The ultrasonic signals (pressure waves) in the liquid medium are incident upon the surfaces of the patient 32 from the six directions of transmission from transmitters 31b–g, and pass completely through such patient. At each acoustic heterogeneity, that is, separation surface between two media having different acoustic impedances within patient 32 as well as at the outer surfaces of body 32, there is developed an ultrasonic echo signal that is reflected therefrom in many directions. Due to the orientation of transmitters 31b–g about object 32a, at least some of the echo signals developed in response to incident ultrasonic signals emitted from each of the transmitters are focussed on detectors 33 by means of acoustic reflector 30. The detectors 33 each are simultaneously sensitive to a broad ultrasonic pressure wave front pattern to thereby receive the multi-directional ultrasonic reflections from object 32a, each detector receiving echo signals only from a particular small region of the heart due to the focussing action of reflector 30.

The plurality of acoustic detectors 33 are spaced close together and the resolution of the detected image in the y axis (vertical) direction (see FIG. 7) which is the vertical axis of the row of detectors can be improved by increasing the number of detectors in the row without increasing the height thereof, that is, by decreasing the spacing between adjacent detectors. The use of 20 to 100 acoustic detectors is a typical example, although, since the detectors and associated amplifiers to be described hereinafter can be fabricated by integrated circuit technology, the cost of each detector-amplifier is relatively low and it is economically feasible to use 200 or even 1,000 detectors in a single row. The acoustic detectors and transmitter may each be of dimension in the order of one-sixteenth inch diameter in order to obtain broad pressure wave front pattern characteristics. The obviously is no reason in spacing the acoustic detectors closer than $\lambda/2$, where $\lambda$ is the wave length of the ultrasonic energy wave in the liquid medium.

Figure 7:
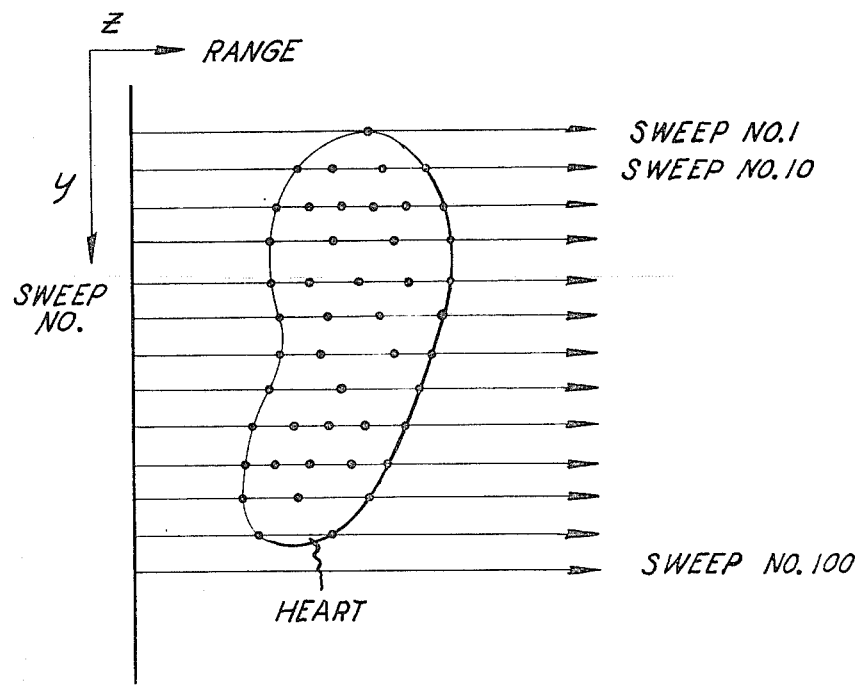
FIG. 7 is a typical cathode ray tube display obtained with the apparatus illustrated in FIG. 5.

Referring now to FIG. 7, there is shown the visual display obtained on the screen of a CRT where the abscissa is herein defined as the Z axis representing the range from the transmitters to the object 32a, and the ordinate is the axis representing the sweep line number of the CRT display (i.e., along the axis of the row of acoustic detectors 33). As will be described with reference to FIG. 8, suitable gating means are utilized for gating the amplifiers associated with the acoustic detectors on and off at desired times to thereby define the depth of field being examined within object 32. Thus, appropriate gating of such amplifiers provides a visual display of only the heart 32a or portion thereof on a cathode ray tube (or other suitable visual display device), such display including any acoustic heterogeneities within the heart such as due to heart valves, arteries, and so on. Each horizontal sweep line on the display may include one or more dots of light, each of which represents an echo signal detected within the defined depth of field within heart 32a by a particular one of the detectors 33.

The transmitters in my apparatus are pulsed one at a time (or two at a time in the case of transmitters symmetrically oriented about apparatus axis 31a) in any desired sequence. After each pulse, ultrasonic echoes are detected by detectors 33 and displayed on a suitable visual display device. Each pulse applied to the transmitter consists of approximately 5 cycles at the ultrasonic frequency so that the transmitter emits a burst of ultrasonic energy. The visual image is therefore formed of the totality of echo signals resulting from the various transmitters, and it is readily apparent that the different orientations of the transmitters greatly reduces the probability of not seeing (detecting) a surface due to specular reflection. Thus, my use of a plurality of differently oriented transmitters results in reduced effects of specular reflection due to the ultrasonic energy being incident on the object being examined from a wide variety of directions on successive pulses. The successive transmitter pulsing may be accomplished at a sufficiently rapid rate to result in a substantially flicker-free visual display to the human eye, and the viewer not being aware that the visual image is sequentially constructed out of seven parts.

Another advantage of using a plurality of transmitters is that the shadowing effects of the transmitters on the reflected waves are eliminated for all the transmitters except one which may be aligned with the detectors. In like manner, in the FIG. 9 embodiment, the shadowing effects of the detectors on the transmitted waves are eliminated for all the transmitters except the on-axis one. Since an on-axis transmitter contributes only one-sixth of the total image (when six transmitters are employed), the shadowing effect thereof is very slight. It should be evident that in the case of an odd number of transmitters, even the center-most located transmitter need not be located on the apparatus axis 31a, and can be at some small angle $\theta$ therefrom in order to also eliminate the shadowing effects enumerated hereinabove. Thus, the apparatus axis 31a is precisely defined as the line coincident with the centerline axis of reflector 30 and the center of the row of detectors 33, and need not include the center-most transmitter, although for simplicity and especially in the case of an odd number of transmitters, such transmitter will be on-axis.

Figure 6:
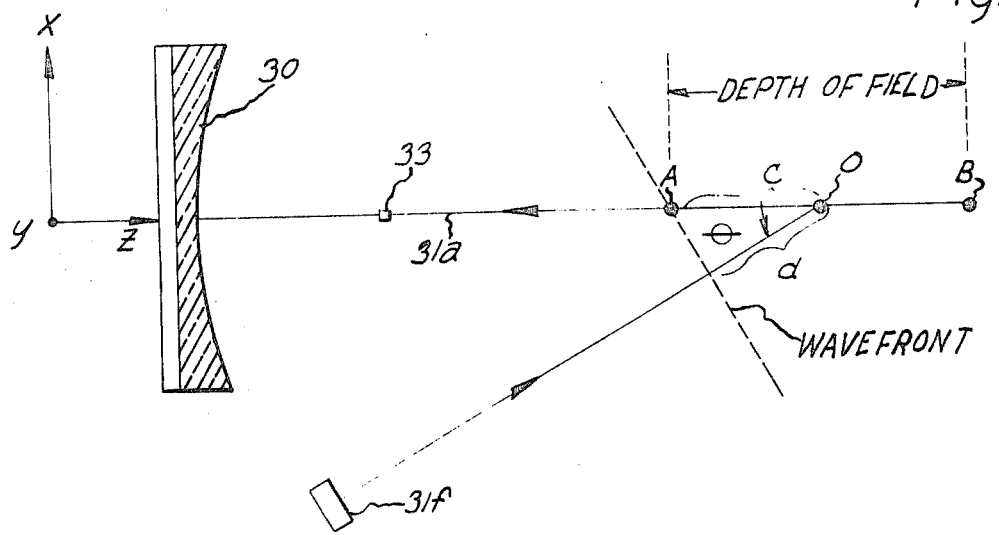
FIG. 6 is a simplified top view similar to FIG. 5, illustrating the effect of different times of arrival at the detectors of echo signals from two different points in the object as a function of the angles of the transmitters.

However, the use of a plurality of transmitters introduces echo time distortions requiring two types of compensation on echo timing when the transmitters are located in the X-Z plane. The first compensation is utilized for the case wherein all of the transmitters are not equidistant from the center "O" of the field of view. Small differences in such distances are compensated for by the insertion of time delays, between the time of transmitter pulsing and commencement of the visual display. The first compensation may not be required in all cases since the transmitters may be precisely positioned to be equidistant from point "O" in many applications. However, the use of off-axis transmitters always introduces a second source of echo time distortions as is depicted in FIG. 6. "Off-axis" is defined herein as any angle relative to the "on-axis" or apparatus axis 31a. Thus, transmitter 31e (in FIG. 9) is on-axis, wherein in FIG. 5, transmitters 31d and 31e are each at small angle $\theta$, relative to the apparatus axis, and transmitters 31b and 31g are indicated as being at the greatest angle, 90° in this case. Assuming the field of view of the object 32a is defined by the limits A and B, it is evident that an angle $\theta$ increases, the time of arrival of the echo signals at the detectors from different points in the depth of field along the system axis decreases, that is, as angle $\theta$ increases, the time between echoes originating at points A and O decreases. This time decrease with increasing angle $\theta$ is determined as follows: let $t$ = time difference between arrival at a detector of echoes from points A and O, let $t_o$ = value of $t$ for $\theta = 0$. From FIG. 6 it is evident that: $t/t_o = c+d/2c$.

Since $d = c \cos \theta$, the equation can be rewritten as: $t/t_o = 1+\cos \theta/2$, which clearly shows that as angle $\theta$ varies from 0° to 90°, the time between echoes (from pointss A and O) decreases by a factor of up to 2.0. This shrinkage in time can be compensated for in a relatively simple manner if the transmitters are all located in the X-Z plane by increasing the sweep speed of the cathode ray tube or other serial input visual display device on which the echo signals are displayed. Thus, for the apparatus illustrated in FIG. 5, three different sweep speeds would be required (assuming the transmitters are oriented symmetrically and pulsed in pairs or individually) since the transmitters are located at three different values of $\theta$.

Figure 10:
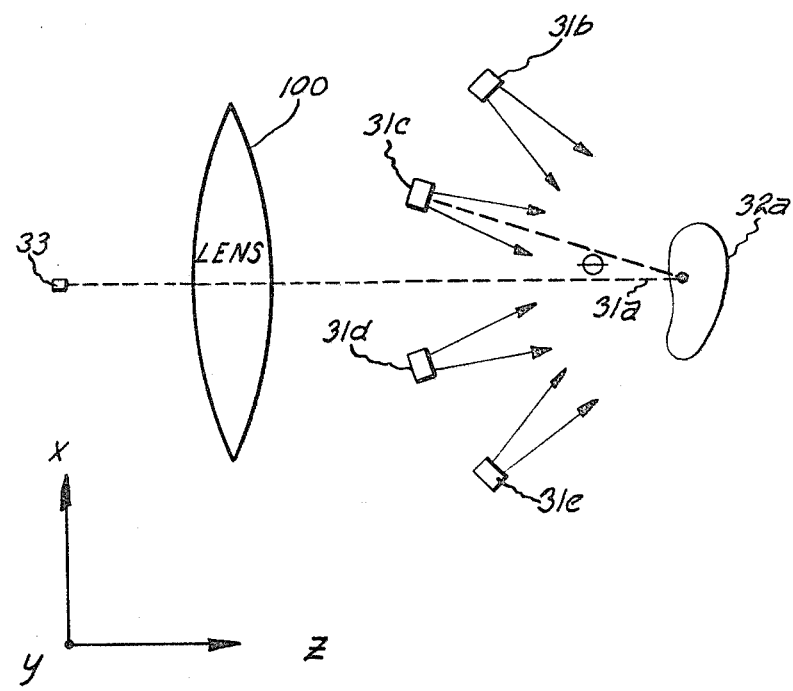
FIG. 10 is a top view of a third embodiment of the ultrasonic imaging components of my invention.
Figure 9:
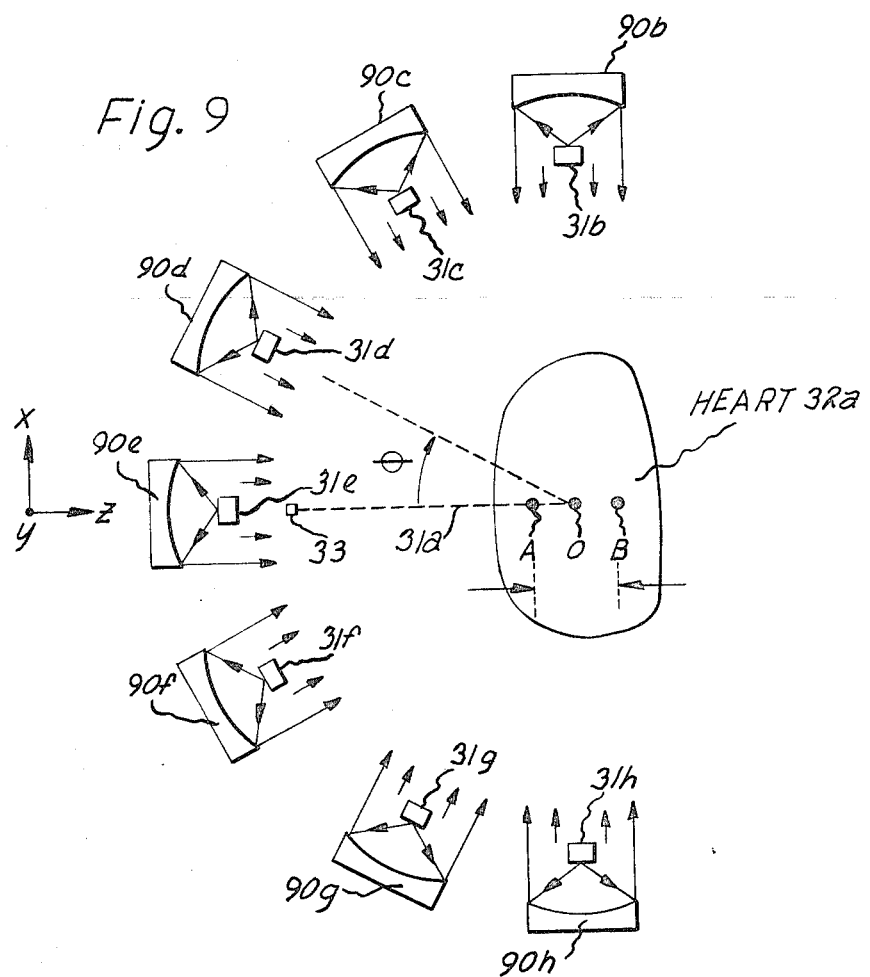
FIG. 9 is a top view of a second embodiment of the ultrasonic imaging components of my invention.
Figure 8:
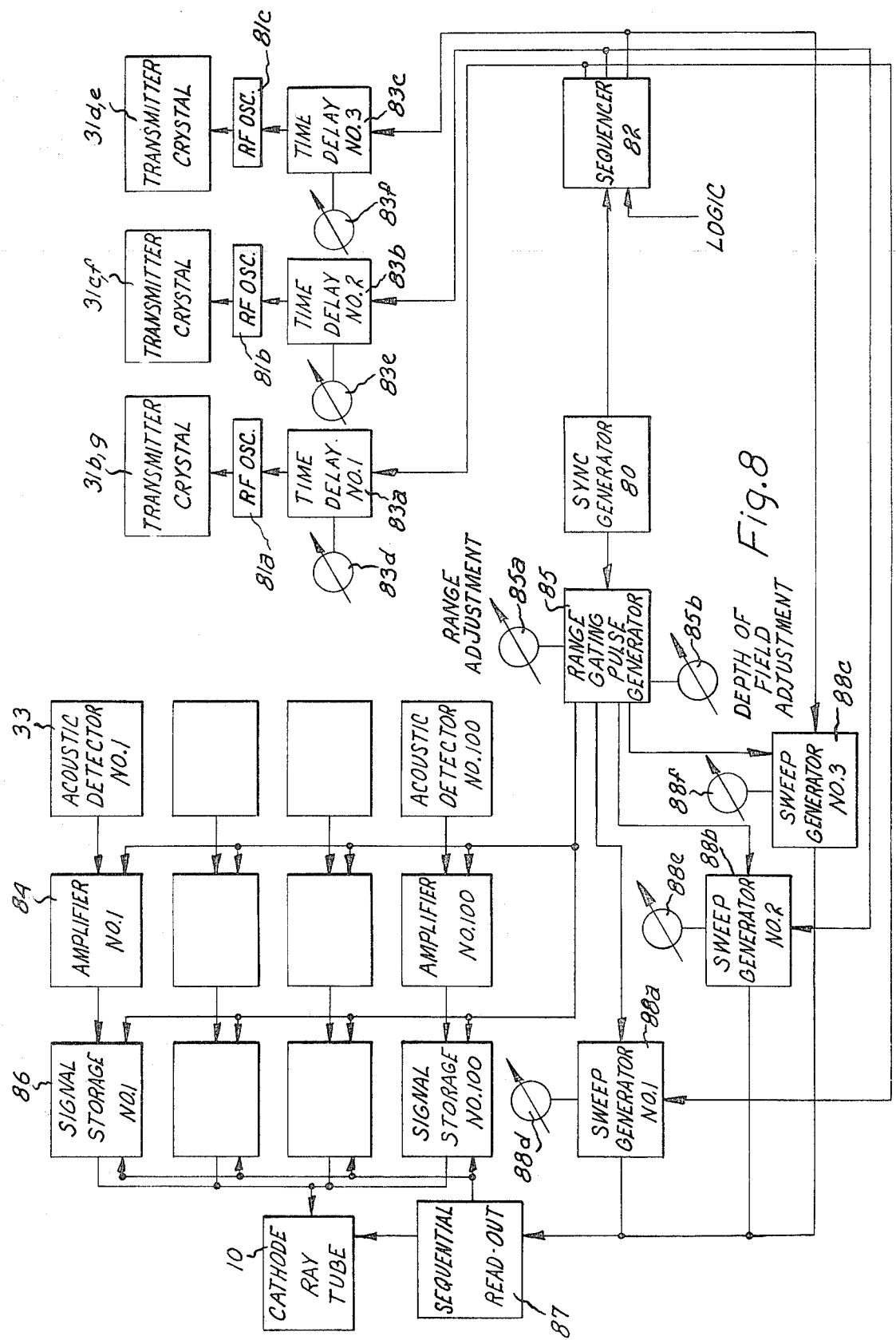
FIG. 8 is a block diagram of the electronic circuitry shown only in part in FIG. 5 for providing the visual display on a conventional cathode ray tube or other serial input visual display device.

Referring now to FIG. 8, there is shown in block diagram form the electronic circuitry associated with the acoustic transmitters 31$b$–$g$ and acoustic detectors 33 in FIG. 5 (and FIGS. 9 and 10). A typical operating mode of my apparatus will now be described with particular reference to the function of each of the components. A synchronizing generator 80 periodically generates short duration voltage pulses which are caused to sequentially control the times of ultrasonic transmission from the piezoelectric crystals of acoustic transmitters 31$b$–$g$ and thus synchronizing generator 80 may be described as generating periodic pulses which establish the zero reference time of operation of my apparatus. The duration of the pulse output of synchronizing generator 80 may be in the order of 1 microsecond and is repeated periodically approximately every 10 milliseconds.

Thus, at essentially the beginning of each 10 millisecond (msec.) period one of the transmitter's pulses, sending a burst of ultrasonic energy toward the patient. During each 10 msec. period, echoes return from the patient to the line of detectors 33, are amplified by amplifiers 84, stored in memory 86, and sequentially read out so as to present a complete line-by-line frame on CRT 10 (or other suitable serial-input display device). During the succeeding 10 msec. period, the same process is repeated, the only difference being that a different transmitter is pulsed, and the sweep parameters then varied according to the angle $\theta$ of the transmitter in use.

If a system had six independent transmitters, as may be the case in FIG. 5, it would thus take 60 msec. to go through a complete "cycle" of sequentially pulsing the transmitters (i.e., a complete display period). During such a cycle, the video echoes presented on succeeding frames of the display will differ somewhat since different transmitters will specularly illuminate different portions of the organ under examination. However, the eye is not aware of this since the system goes through a complete cycle so rapidly, i.e., a 16.7 times per second in the above example. The eye just sees the superposition of the echoes resulting from the various transmitter positions.

In the case of symmetrically oriented transmitters being pulsed in pairs, in the case of six transmitters, the complete display period time is 30 milliseconds. The frame time of 10 msec. is also the approximate time for acoustic reverberations to subside in the tank containing the liquid and various components of my apparatus, although, the reverberation time can, if necessary, be shortened by lining the tank with acoustically-absorbing material. Also, the frame time (i.e., time between transmitter pulses) can, if desired, be shortened by reading the stored signals out of memory 86 more rapidly, and correspondingly speeding up the CRT sweep rate. Also, the frame rate can be considerably increased by using a display device (such as a matrix of light-emitting diodes) which can accept n simultaneous video signals, where $n$ is the number of acoustic detectors in the row. Then, there is no longer any need for storing the video signals and reading them out sequentially, i.e., signal storage 86 in FIG. 8 can be eliminated.

Another way that the system cycle (complete display period) time can be reduced is to locate the transmitters symmetrically in pairs around the system axis, i.e., at the same value of $\theta$. Since the sweep speed correction is a function only of the angle $\theta$, the symmetrical pairs can then be simultaneously pulsed. Thus, for the six-transmitter system shown in FIG. 5, the system cycle time would be three times the frame time instead of six times. In general, it is desirable to keep the system cycle time less than roughly 33 milliseconds, because the human eye begins to perceive flicker when the signals are presented at a frequency less than about 30 cycles/second. However, experience indicates that in the present invention, somewhat longer system cycle times (e.g., 60 milliseconds) can be used without serious flicker, as long as the frame time is kept less than the critical 33 msec. This occurs because the eye is primarily sensitive to the frame rate in regard to perceiving flicker, i.e., the eye does not as readily perceive that some echoes are missing from some frames as a result of specular reflection effects as different transmitter crystals are sequentially used.

In order to permanently record the ultrasonic images, a movie camera can be focused onto the system display, the camera frame rate being made equal to the ultrasonic system cycle rate.

The synchronizing generator 80 in FIG. 8 thus produces a 1 microsecond pulse at a repetition rate of once every 10 msec. The output of synchronizing generator 80 is applied to sequencer 82 for distribution of the synchronizing pulses in some sequence to time delay circuits 83$a$, $b$, $c$. A suitable logic input is provided to sequencer circuit 82 for determining the sequence of transmitter operation. Sequence 82 is a conventional electronic switching circuit for energizing one of a plurality of outputs at a time in succession to an input in accordance with the input logic. The outputs of sequencer 82 are connected to the time delay circuits 82$a$, $b$, $c$. It will be assumed that the symmetrically arranged transmitters can be pulsed in pairs, rather than singly, and therefore only three time delay circuits are required. If the six transmitters were pulsed separately, six time delay circuits would be required. Each time delay circuit may be a conventional multivibrator circuit as one example. As mentioned earlier, this time delay compensation due to the transmitters not each being precisely equidistant from the center of object 32$a$ is a very small factor (e.g., a few microseconds) and the transmitters may often be precisely positioned as to the equidistant from the center of the field of view. Each time delay circuit is provided with a control element (83$d$, $e$, $f$) for independent adjustment of the respective time delay. The outputs of the time delay circuits 83$a$, 83$b$, 83$c$ respectively trigger radio frequency (RF) oscillators (burst generators) 81$a$, $b$, and $c$ to thereby obtain periodic generations of short bursts (several cycles) of a radio frequency signal which will be assumed to be 2.5 megahertz (MHz) in this example in the sequence dictated by the logic imput to sequencer 82. The ultrasonic frequency range is defined as being between 1 and 10 MHz. Assuming a burst of five cycles is generated within one of RF oscillators 81a, b, c for each input synchronizing pulse, such fine cycle pulse train is applied to a corresponding piezoelectric transmitting crystal pair 31b, g, or 31c, f, or 31d, e as determined by the logic input to the sequencer.

The application of each five cycle pulse train to a piezoelectric transmitting crystal converts such electrical pulse train to a periodic 2.5 MHz pulsed ultrasonic pressure wave signal of 2 microsecond duration. Since sound travels at approximately 1,500 meters per second in water or flesh, the wavelength of each ultrasonic pulse is 0.6 millimeters (mm) and the physical length of the periodic five pulse ultrasonic pressure wave train is 3.0 mm in water.

Assume in FIGS. 5 or 10 that the distance from the acoustic transmitter to the center of the field of view (e.g., center of patient's heart) is 35 cm, and that the field of view is 7.5 cm deep, measured along the Z axis. Also assume that the total distance from the center of the field of view to the mirror (or lens) and then to the row of detectors is 120 cm. It will then take the acoustic pulse train approximately 208 microseconds to travel from the transmitter to the beginning of the field of view, and an additional 776 microseconds for echoes from this point to reach the row of acoustic detectors. Thus, the first ultrasonic echo signals of interest arrive at the detectors aproximately 984 microseconds from the zero reference time established by synchronizing generator 50. At the time of 984 msec. after the generation of each periodic synchronizing pulse (zero reference time), the 100 simultaneously responsive detector-amplifiers 84 which are connected to the outputs of their associated acoustic detectors 33 are gated on by means of a " turn-on" signal periodically generated within range gating pulse generator 85 in response to the periodic synchronizing pulse. The spacing between adjacent detectors 33 can be as small as half a wavelength of the transmitting frequency, as stated hereinabove, and for the case of RF oscillator 81 operating at 2.5 MHz, the half wavelength spacing would be 0.3 mm. At a transmitting frequency of 10 MHz, each half wavelength spacing would be 0.08 mm.

The periodic "gating-on" signals from range gating pulse generator 85 are supplied to second inputs of each of the 100 amplifiers 84 associated with the 100 acoustic detectors 33 and render responsive such amplifiers to obtain amplification of the low level voltage signals developed in the acoustic detectors 33 in response to each series of the detected ultrasonic echo signals obtained as the result of sequential operation of transmitters 31b–g. The outputs of the plurality of detector-amplifiers 84 are connected to the inputs of a like plurality of suitable memory elements 86 for providing separate temporary storage of each series of the amplified electrical signals corresponding to the ultrasonic echo signals (resulting from each separate transmitter operation) in the desired depth of field defined by range gating pulse generator 5. The "gating on" signal is also applied to memory elements 86 for reading in the amplified signals. Thus, the periodic "gating on" of amplifiers 84 also causes the detected echo signals from each of the detectors 33 to be correspondingly periodically stored in parallel in a corresponding number of memory elements 86. The memory component can be electronic semiconductor memories, a videotape or a rotating magnetic disc as three typical examples. The purpose of the temporary signal storage in memory elements 86 is to provide a suitable time delay such that the parallel-addressed memory elements may be read out serially to thereby utilize a conventional cathode ray tube 10 or other suitable serial input visual display device on which to develop the visual display of the ultrasonic echo signals.

It will be assumed that the region of interest in the body of the patient 32 is a depth of field of 7.5 cm which requires that the memory elements accept and store the ultrasonic echo signals for a "read-in" period of 100 msec. Since this time of 100 microsecond is 50 times the 2 microsecond ultrasonic pulse length, one obtains 50 resolution elements in the horizontal direction (range) on the CRT display. It will further be assumed that three bits per picture element are utilized for grey scale and therefore the total number of bits of signal storage required per detector per pulse is 150 which is readily achieved by existing semiconductor memories at low cost.

After this time interval of 100 microseconds for "read-in" time, amplifiers 84 are gated off (rendered non-responsive) by means of a periodic "turn-off" signal developed within range gating pulse generator 85, and the memory elements 86 have their read-in terminated and may then be read out sequentially. Sequential read-out circuit 87 connected to the outputs of the sweep generators provides synchronization of the memory elements read-out with the line-by-line sweeps. Thus, the echo signals in electrical form are simultaneously stored (in parallel) in the memory elements 86 and are then sequentially (serially) read out. The reading out of the memories intensity modulates the scan lines to form the resultant image on the cathode ray tube 10. The sweep lines (scans) on the CRT display are generated in sweep generators 88a, b, c, wherein sweep generator 88a is associated with transmitters 31b, g, sweep generator 88b is associated with transmitters 31c, f, and sweep generator 88c is associated with transmitters 31d, e. Assuming that the transmitters are pulsed in the sequence 31b, g, then 31c, f, and then 31d, e, and this cycle is repeated as often as required by the physician or other observer of the visual display, then the sweep generators are operated in like sequence (88a, them 88b, and then 88c) due to their being rendered responsive from both the output of sequencer 82 and the output of range gating pulse generator 85. Thus, after sequencer 82 has caused transmitters 31b, g to transmit ultrasonic signals, and any resultant received echo signals have been imaged on detectors 33, and the echo signals within the field of view defined by range gating pulse generator 85 have been stored in memory elements 86, the memory elements are read out serially and synchronously with the line-by-line sweeps generated by sweep generator 88a. Each sweep line is associated with a corresponding acoustic detector-amplifier-memory element.

After the portion of the visual display developed from the operation of transmitters 31b, g has been presented on CRT 10 (it is assumed these displays are virtually identical since the transmitters are oriented symmetrically) sequencer 82 causes transmitters 31c, f to transmit ultrasonic signals, and the steps are repeated as described above, except that the memory elements are now read out serially and synchronously with line-by-line sweeps generated by sweep generator 88b. Finally, sequencer 82 causes transmitters 31d, e to transmit and sweep generator 88c becomes operative to develop the portion of the visual display resulting from the operation of such transmitters. The sweep speed of sweep generator 88a is adjusted by means of control element 88d to be increased over the sweep speed of sweep generator 88b, which in turn has its sweep speed adjusted by means of control element 88e to be increased over the sweep speed of sweep generator 88c. These sweep speed adjustments, as well as a sweep speed adjustment of sweep generator 88c by means of control element 88f provides the compensation of echo timing resulting from the off-axis orientation of the transmitters described hereinabove. The stored information can be read out of the memory 86 at the same rate or slightly faster so as to produce a frame time of 10 msec. for the part of the display obtained from the operation of one transmitter, and in the case of six independently-pulsed transmitters requires 60 msec. to produce a complete system cycle (i.e., composite of the six parts) on the cathode ray tube display, although, as mentioned hereinabove, the readout and display can be done at a considerably faster rate, if required, by the use of more complex and expensive electronic circuitry. The optical display on the CRT has the advantage of providing direct and continuous (as far as the human eye response is concerned) observation of the object being examined, and is of high resolution due to the close spacing of detectors 33 and time domain discrimination of the reflected echo signals.

The transmitters 31b–g and CRT sweeps (scans) can be aligned by the following procedure. Test objects are positioned at points A and B (see FIG. 6) which define the limits of a particular depth of field desired to be examined. The transmitters are then pulsed one at a time, and the time delay controls 83d–f and sweep speed controls 88d–f are adjusted so that the echo signals from points A and B appear at the same two points on the CRT display.

All of the electronic circuits hereinabove described can be of conventional type. The range gating pulse generator 85 consists of a variable delay generator triggered by the synchronizing pulses from synchronizing generator 80, and the output of the variable delay generator is a delayed trigger pulse having a predetermined delay in relation to the synchronizing pulse which can be adjusted by means of control element 85a. Such delayed trigger pulse is applied to a gating pulse generator which develops a pulse having a leading edge in time coincidence with the leading edge of the delayed pulse and is of duration equal to the gated-on time of the amplifiers 84. The duration of the gating pulse can be adjusted by means of control element 85b and determines the depth of field of inspection in the object being examined. Thus, the periodic pulse generated in component 85 periodically renders amplifiers 84 responsive after a first predetermined interval of time from a periodically occurring zero reference time, and maintains response of the amplifiers for a second predetermined interval of time. The sequential read-out 87 may include a shift register having its plurality of outputs connected to the signal storage elements 86 to thereby provide the sequential read-out thereof in synchronism with the line-by-line scans.

The entire apparatus including all of the electronic circuitry and ultrasonic imaging components may be mounted in the tank containing the liquid medium in which are developed the ultrasonic energy waves with the exception of cathode ray tube 10 (or other suitable visual display device) which is preferably positioned outside of the tank. Alternatively, only the acoustic transmitters 31, reflector 30, and detector-amplifier components are mounted within the tank and the electronic circuitry is located external thereof. Suitable mounting means are provided in the tank for maintaining transmitters 31b–g in position and for maintaining reflector 30 and the center of detectors 33 in alignment with the object 33a being examined.

The spatial resolution in the Z (range) axis direction can be improved by utilizing a higher frequency of RF excitation of the transmitter crystals. Thus, at 10 MHz, a 5 cycle pulse would increase the Z direction spatial resolution to 0.38 mm. For the same depth of field of viewing of 7.5 cm, 200 image (resolution) elements in the horizontal range (Z-axis) direction would be obtained and thus require four times the memory required for the first example of only 50 resolution elements in the Z-axis. The depth of field examined in the object can be increased by proper adjustment of control 85b to thereby gate the amplifiers 84 "on" for a longer time period and correspondingly increasing the memory capacity up to the point of diminishing return at which a depth of focus problem occurs wherein the complete planar slice through the object cannot be focused upon the single row of detectors. As stated hereinabove, the Y-direction resolution of the display can be improved by adding more detectors to the row, i.e., by spacing them more closely together which spacing can be decreased to the limit of one-half of the signal propagation wavelength in the liquid, although diffraction effects will often cause the lower limit on useful detector spacing to be somewhat larger than half the acoustic wavelenth.

Referring now to FIG. 9, there is shown a second embodiment of my invention wherein, as distinguished from the previous embodiment, acoustic transmitters 31b–h respectively direct their ultrasonic energy outputs at associated reflective optics member 90b–h which may be of the concave type illustrated in FIG. 5. The advantage of the FIG. 9 embodiment is that by positioning the acoustic transmitters 31b–h at the focal points of the associated reflectors 90b–h, resultant parallel (planar) pressure wavefronts of the ultrasonic energy waves are directed at the object 32a being examined. These planar wavefronts of the incident ultrasonic energy reduce range distortion due to curvature of such wavefronts in the FIG. 5 embodiment. The single row of simultaneously responsive detectors 33 may again be positioned at a spacing from the reflector of approximately 1.5 times the focal length of reflector 90e, and when such detector spacing is approximately midway between reflector 90e and object 32a, the object imaged upon the detectors is one-half the height of the actual object. Seven transmitters are depicted in the FIG. 9 embodiment, with the centrally oriented transmitter 31e being "on-axis", that is, having its axis (center-line axis of signal propagation therefrom) being coincident with the apparatus center-line axis 31a, to indicate another orientation of the transmitters which could also be utilized in FIG. 5 with appropriate provision being made for the additional transmitter.

Referring now to FIG. 10, there is shown a third embodiment of my invention wherein refractive optics is utilized instead of the reflective optics as in FIGS. 5 and 9 for focusing the ultrasonic image onto the single row of simultaneously responsive detectors. An acoustic lens 100 of the converging type such as double convex is fabricated of a suitable plastic material (or liquid-filled plastic shell) and is positioned in alignment with the center of the row of acoustic detectors 33 and with the center of the object 32a being examined, as is the alignment of the acoustic reflector in FIGS. 5 and 9 embodiments. Lens 100 images the ultrasonic reflections at the focal plane of the lens wherein the focal plane is spaced from the lens a distance greater than the focal point thereof since the lens-incident ultrasonic echo signal wavefront is not planar due to the relatively close spacing of object 32a to the opposite side of the lens. The distance from lens 100 to object 32a is preferably greater than twice the focal length of lens 30 such that the object imaged upon detectors 33 is smaller than the actual object and inverted. In a typical example, the distance from lens 100 to object 32a is twice the distance from lens 100 to detectors 33 to thereby obtain an image one-half the height of object 32a. The FIGS. 5 and 9 embodiments are preferred over the FIG. 10 embodiment primarily because the acoustic lens is more difficult to fabricate and may suffer undesired reflective losses at the ultrasonic frequencies. The particular example of the system performance described with reference to FIGS. 5 and 8 is also valid for the FIG. 10 (and FIG. 9) embodiments. The FIG. 10 embodiment illustrates the use of four off-axis transmitters 31b–e oriented along an arc extending only approximately ±45° about object 32a from the apparatus center-line axis 31a. Although some echo signal loss due to specular reflection may occur with this smaller number of transmitters distributed over a smaller arc around object 32a, the performance will still be considerably superior to that of only a single transmitter.

Obviously, in each of the FIGS. 5, 9 and 10 embodiments the spacing between detectors and focussing optics, and, or spacing between the detectors and object being examined may be varied resulting in changes in height of the object imaged upon the detectors in accordance with well known optics theory. In the FIG. 9 embodiment, in the case wherein the reflectors 90b–h are smaller than the object 32a being examined, the acoustic transmitters 31b–h are positioned closer to the respective reflectors than the focal point spacing thereof in order to obtain a desired fanout or spreading of the ultrasonic beams reflected from the reflectors to thereby irradiate the object 32a desired to be examined. The visual displays developed from the apparatus of the FIGS. 9 and 10 embodiments are identical to that developed from the FIG. 5 embodiment since the electronic circuitry of FIG. 8 is also utilized therewith.

In the FIG. 8 circuit for obtaining a visual display of th ultrasonic echo signals emitted from the object being examined, a conventional cathode ray tube 10 is utilized which requires the use of a memory 86 for temporarily storing the detected signals and a subsequent sequential read-out thereof. The use of such memory or equivalent sample-and-hold circuitry, both of which provide sequential (serial) outputs, can be omitted and the outputs of gated-on amplifiers 84 are simultaneously applied to multi-inputs of a multi-beam cathode ray tube or other multi-input visual display component 110 as illustrated in the block diagram of FIG. 11. In the case of component 110 being a cathode ray tube, it is not of conventional design and is described and claimed in concurrently filed patent applications Ser. No. 285,911, inventor Lawrence A. Harris, entitled MULTIBEAM CATHODE RAY TUBE UTILIZING D.A.M.GRID, and Ser. No. 285,912, inventor John M. Houston, entitled INVERTED IMAGE MULTIBEAM CATHODE RAY TUBE, each assigned to the assignee of the present invention. Cathode ray tube 110, in the case of a single row of 100 acoustic detectors 33 application, is provided with 100 signal inputs from the outputs of a like 100 detector-amplifiers 84. The FIG. 11 electronic circuitry may be utilized with any of the FIGS. 5, 9 or 10 embodiments as in the case of the FIG. 8 electronic circuitry. The obvious advantage of the FIG. 11 circuit utilizing a multibeam cathode ray tube as one example is the same rapid display of the signals on the tube since the sweep lines on the CRT are simultaneously generated and the amplifiers 84 supply their outputs simultaneously to the CRT rather than on a line-by-line basis as in FIG. 8. The same range gating pulse generator 85 is utilized for gating the amplifiers 84 on and off as in the case of the FIG. 8 circuit as well as for synchronizing the start of the plurality of sweeps (100 in the case of 100 detectors) and on the multibeam cathode ray tube which are simultaneously initiated upon the amplifiers 84 being gated on. The electronic circuitry utilized in the FIGS. 8 and 11 block diagrams are conventional and not particularly complex or fast, i.e., much slower than those used in modern computers.

Figure 11:
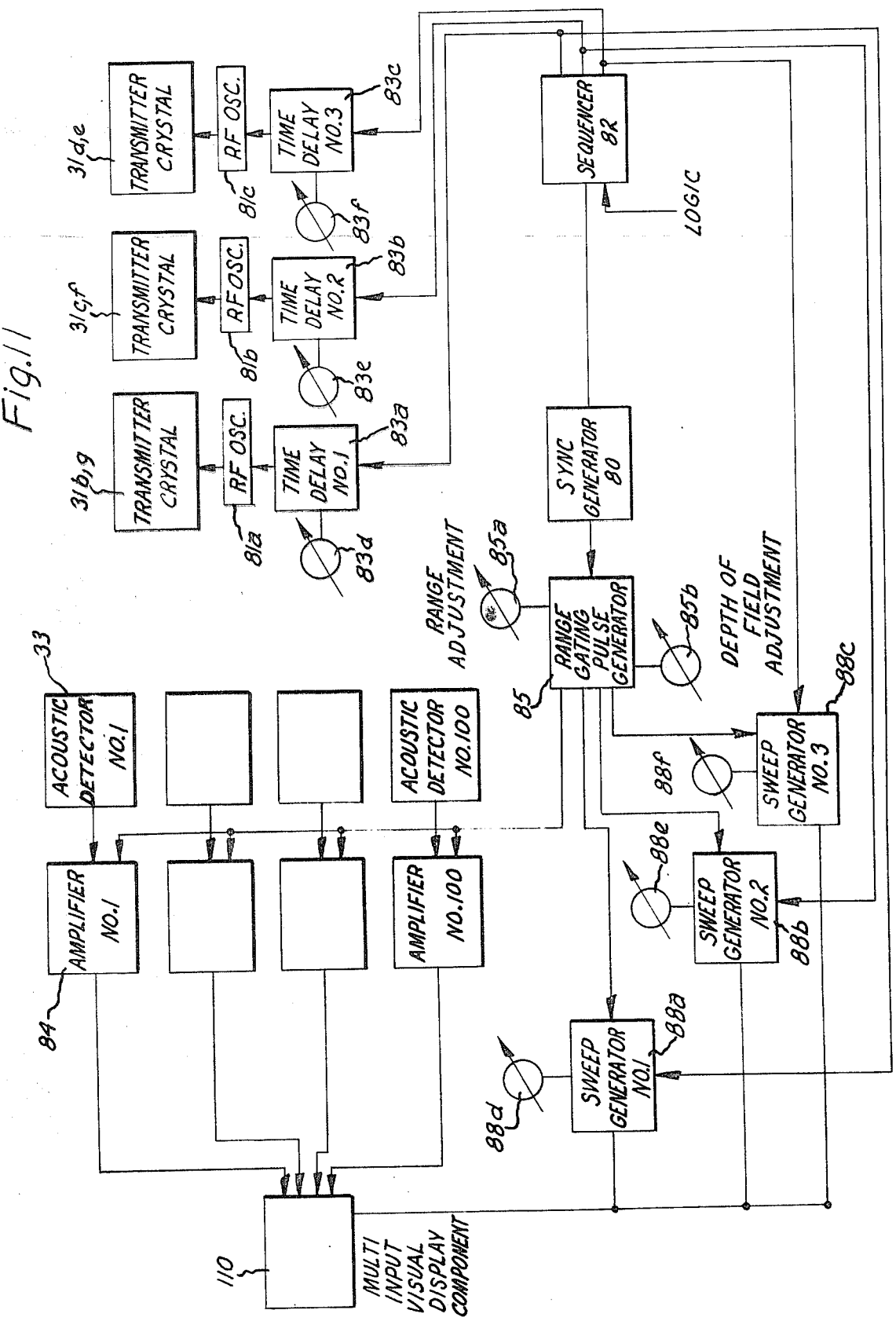
FIG. 11 is a block diagram of the electronic circuitry for providing the visual display on a multibeam cathode ray tube or other parallel input visual display device.

Other examples of simultaneous multi-input visual display components 110 which may be utilized in my FIG. 11 embodiment are (1) a plasma display panel of an array of rows and columns of gas discharge devices, (2) an array of rows and columns of liquid crystals, and (3) an array of rows and columns of light emitting diodes. In each of these components, each row is connected to the output of a corresponding amplifier 84, and each (range) column (i.e., scanning input) is sequentially energized by means of appropriate signals generated in a range timing circuit similar to the sequential read-out 87 in FIG. 8 and also triggered by range gating pulse generator 85.

The preceding discussion has dealt only with the plurality of transmitters being located in the X-Z plane. Such orientation of the transmitters is preferred for its simplicity, however, the transmitters can be located anywhere in the hemisphere to the left of point O in FIG. 6, i.e,, the transmitters can be off-axis in the ± Y direction as well as the ± X direction. Compensation for echo time distortion introduced by the transmitters being off-axis in the ± Y direction is obtained by introducing suitable time delays which are proportional to detector position when storing the signals in memory elements 86.

From the foregoing description, it can be appreciated that my invention makes available an improved method and apparatus for providing visual display of ultrasonic echo signals reflected from an object being examined with substantially reduced (or entirely eliminated) effects of specular reflection. Since the apparatus can discriminate in the time domain and therefore provides visualization in depth, the apparatus is especially useful in medical diagnostics for examining internal organs and blood vessels and may also be utilized for detecting flaws in manufactured objects. The optical display on the cathode ray tube or other visual display device obtained with my apparatus can be directly and continuously observed, and is of high resolution due to the close spacing of the detectors and time domain discrimination of the reflected echoes. The method and apparatus utilizes a plurality of angularly oriented acoustic transmitters and a single row of a plurality of (20 to 1,000) acoustic detectors which convert the detected reflected ultrasonic signals into electrical signals for visual presentation on a visual display device. The visual display is that of a planar slice through the object wherein the plane is defined by the axis along which the acoustic detectors are positioned, and the center-line axis of the apparatus defined by the axis of the focussing member and center of the detectors. The thickness of the planar slice, that is, the depth of field in the object being examined is readily controlled by time domain discrimination of the circuit whch controls the on and off times of electronic amplifiers connected to the outputs of the acoustic detectors. The visual display is appropriately corrected to compensate for echo time shifts caused by off-axis transmitters, and transmitters not equidistant from the center of the object being examined so that all echoes from a given point in the object appear at the same point on the visual display device regardless of which transmitter was pulsed. The apparatus utilized in my system consists of relatively simple and inexpensive components and provides a sufficiently fast response time such that a visual display frame speed in the order of 15 to 100 frames per second is readily achieved thereby permitting direct display of the motion of the object being examined such as the human heart, or permitting the taking of movie pictures of such organ's motion.

Having described a number of specific embodiments of my invention, it is believed obvious that modification and variation of my invention is possible in light of the above teachings. Thus, other types of conventional electronic circuitry for achieving the functions described with reference to the FIGS. 8 and 11 block diagrams may be utilized in place of these enumerated therein. Obviously, there need not be utilized the plurality of sweep generators illustrated in FIGS. 8 and 11, and a single sweep generator may be used with appropriate control of the sweep speeds governed by the sequencer output. Finally, although the amplifiers and storage elements are described and depicted in FIG. 8 as being gated on and off from the output of the range gating pulse generator, it should be obvious that the amplifiers may be continually responsive and only the memory elements need be gated on and off. It is, therefore, to be understood that changes may be made in the particular embodiments as described which are within the full intended scope of the invention as defined by the following claims.

What I claim as new and desire to secure by Letters Patent of the United States is:

1. Apparatus for providing a visual display of ultrasonic echo signals reflected from an object and its internal acoustic heterogeneities comprising a plurality of acoustic transmitters oriented about an object being examined and controllably operated for sequentially generating periodic pulsed ultrasonic frequency pressure wave signals in a liquid medium which are directed at the object from a plurality of directions, means for directing the periodic ultrasonic signals at the object, a plurality of closely spaced simultaneously responsive acoustic detectors arranged in a single row along an axis perpendicular to the centerline axis of the apparatus for detecting ultrasonic echo signals reflected from the object in response to each periodic ultrasonic signal incident thereon and for converting the detected ultrasonic signals to equivalent electrical signals, acoustic image focussing means for imaging the ultrasonic echo signals onto said acoustic detectors, the centerline axis of the apparatus being defined by the centerline axis of said focussing means and the center of the row of detectors, a like plurality of amplifying means connected to outputs of associated said acoustic detectors for amplifying the electrical signals developed by said detectors, means in communication with outputs of said signal amplifying means for providing a visual display of the detected echo signals wherein each line of the visual display is associated with a corresponding acoustic detector, means in communication with inputs of said acoustic transmitters for generating periodic short duration electrical pulses which sequentially trigger the generation of the periodic pulsed ultrasonic signals from said transmitters and also establishes a periodic zero reference time of operation of said apparatus, and means having an input connected to an output of said periodic short duration electrical pulse generating means and an output connected to inputs of said signal amplifying means for simultaneously gating all of the signal amplifying means periodically on and off at desired time intervals corresponding to the depth of field in the object being examined, each line of the visual display depicting the echo signals reflected from the object and its internal heterogeneities and detected by the associated acoustic detector within the depth of field defined by said gating means whereby the display represents a visualization in depth of a planar slice of the object wherein the slice lies in a plane defined by the centerline axis of the apparatus and the axis of the single row of detectors, the echo signals resulting from the sequential operation of the transmitters and received by said detectors being sequentially displayed on said visual display means wherein the echoes originating from the same points in the object appear at corresponding same points on said visual display means to thereby substantially reduce loss of image resolution due to the effects of specular reflection off the object.

2. The apparatus set forth in claim 1 and further comprising means connected between an output of said gating means and an input of said visual display means for correcting the visual display to compensate for echo time shifts caused by said transmitters which are located off-axis wherein off-axis is defined as nonaligned with the apparatus centerline axis.

3. The apparatus set forth in claim 2 wherein said plurality of transmitters are located in a plane perpendicular to the axis of said detectors and containing the centerline axis of the apparatus.

4. The apparatus set forth in claim 2 wherein said plurality of transmitters are oriented about the object at various angles and substantially equally spaced therefrom.

5. The apparatus set forth in claim 3 wherein said plurality of transmitters are oriented about the object at various angles and substantially equally spaced therefrom.

6. The apparatuo set forth in claim 2 wherein said plurality of transmitters are distributed along approximately a 180° arc about the object.

7. The apparatus set forth in claim 2 wherein said plurality of transmitters are distributed along an arc less than 180° about the object.

8. The apparatus set forth in claim 2 wherein said plurality of transmitters are distributed in spaced apart relationship along an arc about the object.

9. The apparatus set forth in claim 8 wherein said plurality of transmitters are distributed in equal spaced apart relationship along the arc.

10. The apparatus set forth in claim 2 wherein said off-axis compensation means comprises adjustment means for increasing the sweep speed of said visual display means with increasing off-axis angle of orientation of the transmitters.

11. The apparatus set forth in claim 2 and further comprising
means connected between outputs of said periodic short duration electrical pulse generating means and inputs of said transmitters for correcting the visual display to compensate for echo time shifts caused by said transmitters being nonequidistant from the center of the field of view in the object.

12. The apparatus set forth in claim 11 wherein said nonequidistant from center compensation means comprises time delay circuits for adjustment of the times between each transmitter pulsing and commencement of the corresponding visual display.

13. The apparatus set forth in claim 1 wherein said ultrasonic signal directing means consists of said transmitters being oriented such that the outputs thereof are directed toward the object being examined whereby the sequentially generated pulsed ultrasonic signals propagate directly from said transmitters to the object.

14. The apparatus set forth in claim 1 wherein said acoustic image focussing means is a plurality of concave type acoustic reflectors equAl in number to the plurality of transmitters, each reflector associated with a corresponding transmitter and aligned with the centerline axis of signal propagation therefrom,
said ultrasonic signal directing means consists of said acoustic reflectors and the outputs of said transmitters being directed toward said acoustic reflectors whereby the generated pulsed ultrasonic signals propagate from said transmitters to said acoustic reflectors and are reflected therefrom toward the object being examined.

15. The apparatus set forth in claim 2 wherein said acoustic image focussing means is of the reflective concave type and is aligned with the centerline axis of the apparatus whereby the ultrasonic echo signals are reflected from said acoustic image focussing means for imaging onto said acoustic detectors.

16. The apparatus set forth in claim 1 wherein said acoustic image focussing means consists of a converging type acoustic lens positioned between said acoustic detectors and the object being examined and aligned with the centerline axis of the apparatus.

17. The apparatus set forth in claim 1 wherein said acoustic image focussing means consists of a concave type acoustic reflector aligned with the centerline axis of the apparatus, said acoustic detectors positioned between said acoustic reflector and the object being examined and spaced from said reflector beyond the focal point thereof.

18. The apparatus set forth in claim 1 and further comprising
means connected between outputs of said amplifying means and an input of said visual display means for temporarily storing the amplified electrical signals, and
means in communication with said gating means for periodically generating sequential signals which are applied to said signal storage means to provide periodic sequential read-out of the amplified electrical signals to said visual display means to thereby develop the image on said visual display means wherein serial scans are formed and intensity modulated by the echo signals resulting from the sequential operation of the transmitters.

19. The apparatus set forth in claim 18 wherein said visual display means is a cathode ray tube.

20. The apparatus set forth in claim 18 wherein said visual display means is a cathode ray tube provided with a single signal input connected to a common output of said signal storage means.

21. The apparatus set forth in claim 1 wherein said visual display means is a parallel input device having a like plurality of inputs connected respectively to separate outputs of said amplifying means whereby the outputs of said amplifying means are simultaneously applied to the plurality of inputs of said visual display means.

22. The apparatus set forth in claim 21 wherein said visual display means is a multi-input cathode ray tube wherein the sweep lines are simultaneously generated to thereby provide a more rapid display of the detected echo signals.

23. The apparatus set forth in claim 21 wherein said visual display means is a plasma display panel containing an array of rows and columns of gas discharge devices, the gas discharge devices being connected row-by-row respectively with the outputs of said amplifying means, and the columns being sequentially energized by signals generated in a range timing circuit triggered by said gating means.

24. The apparatus set forth in claim 21 wherein said visual display means is an array of rows and columns of liquid crystals, the crystals being connected row-by-row respectively with the outputs of said amplifying means, and the columns being sequentially energized by signals generated in a range timing circuit triggered by said gating means.

25. The apparatus set forth in claim 21 wherein said visual display means is an array of rows and columns of light emitting diodes, the diodes being connected row-by-row respectively with the outputs of said amplifying means, and the columns being sequentially energized by signals generated in a range timing circuit triggered by said gating means.

26. The apparatus set forth in claim 1 wherein said acoustic transmitters, said acoustic detectors and the object being examined are immersed in the liquid medium.

27. The apparatus set forth in claim 1 wherein said plurality of acoustic detectors are of number in the range of 20 to 1,000.

28. The apparatus set forth in claim 1 wherein said acoustic transmitters are piezoelectric transducers for converting electrical exciting waves into equivalent ultrasonic pressure waves in the liquid medium in which said transmitters, detectors and object being examined are positioned.

29. The apparatus set forth in claim 1 wherein said acoustic transmitters and detectors are each piezoelectric transducers, the minimum spacing between adjacent acoustic detectors is one half the wavelength of the ultrasonic signal in the liquid medium.

30. The apparatus set forth in claim 29 wherein said acoustic detectors are equally spaced apart.

31. The apparatus set forth in claim 14 wherein said row of acoustic detectors are spaced approximately mid-way between a center-most of said acoustic reflectors and the object being examined.

32. The apparatus set forth in claim 1 wherein the wavefront pattern of periodic ultrasonic pressure wave signals generated by said acoustic transmitters is sufficiently broad to illuminate the entire object being examined, and the periodic short duration electrical pulses are repeated approximately every 10 milliseconds and a complete display period rate of slightly less than 15 per second does not present a flicker problem since each complete display is a plurality of frames forming a composite of the visual displays resulting from a sequential operation of the plurality of transmitters.

33. Apparatus for providing a visual display of an object undergoing motion and its internal acoustic heterogeneities by means of ultrasonic echo signals reflected therefrom and comprising a plurality of acoustic transmitters controllably operated for sequentially generating periodic pulsed ultrasonic frequency pressure wave signals in a liquid medium which are directed at an object being examined from a plurality of directions, the wavefront pattern of each ultrasonic signal being sufficiently broad to be incident on the entire area of interest on the object being examined, a plurality of at least 20 closely spaced acoustic detectors arranged in a single row within the liquid medium along an axis perpendicular to the centerline axis of the apparatus, said detectors being simultaneously responsive for detecting ultrasonic echo signals periodically reflected from the object in response to the periodic generated ultrasonic signals incident thereon and for converting the detected ultrasonic echo signals to equivalent periodic electrical signals, each detector being sensitive to a broad ultrasonic pressure wavefront pattern to thereby receive multidirectional reflections from a particular echo producing region in the object being examined, a concave acoustic reflector located within the liquid medium and aligned with the center of the row of detectors which together determine the centerline axis of the apparatus, said detectors located between said acoustic reflector and the object being examined, said transmitters oriented in an arc extending partially around the object in a plane perpendicular to the axis of the row of detectors and including the centerline axis of the apparatus, a like plurality of amplifiers connected to outputs of associated said acoustic detectors for amplifying the electrical signals developed by said detectors, means in communication with outputs of said amplifiers for providing a visual display of the detected ultrasonic echo signals, an electronic synchronizing generator for periodically generating short duration electrical pulses which inititate the periodic operation of said ultrasonic transmitters and also establishes a periodic zero reference time of operation of said apparatus, means in communication with an output of said synchronizing generator for sequencing the operation of said transmitters in accordance with a particular logic, an electronic range gating pulse generator having an input connected to an output of said synchronizing generator and a first output connected to inputs of said amplifiers for simultaneously gating all of the amplifiers periodically on and off at the repetition rate of generation of the short duration electrical pulses, the gating on time corresponding to the range of the object being examined and the time interval between gating on and gating off corresponding to the depth of field in the object being examined to thereby obtain a time domain discrimination of the ultrasonic echo signals, a second output of said range gating pulse generator providing a periodic synchronizing signal to a sweep generator which provides the scan input to said visual display means, said sweep generator further provided with an input from an output of said transmitter operation sequencing means, each scan line of the visual display depicting the superimposed echo signals resulting from the sequential operation of the transmitters and detected by an associated acoustic detector within the depth of field defined by said range gating pulse generator whereby the display represents a moving visualization in depth of a planar slice of the object while it is undergoing motion whrein the slice lines in a plane defined by the centerline axis of the apparatus and the axis of the single row of detectors, and means for adjusting the sweep speed of said sweep generator in accordance with the orientation of each transmitter located off the centerline axis of the apparatus to thereby compensate for echo time shifts on the visual display caused by the off-axis transmitters.

34. The apparatus set forth in claim 33 and furthter comprising memory means connected between outputs of said amplifiers and a single signal input of said visual display means for temporarily storing the amplified electrical signals, the output of said range gating pulse generator providing the gating on and gating off signals to said memory means whereby the amplifiers may be continually responsive, and means having an input in communication with an output of said range gating pulse generator and having outputs connected to inputs of said memory means for periodically generating signals for sequentially reading out the memory means and thereby serially supplying the read out amplified electrical signals to the single signal input of said visual display means, said visual display means being a serial input device.

35. The apparatus set forth in claim 33 wherein said visual display means being a parallel input device having a like plurality of signal inputs connected to the outputs of associated said amplifiers, the periodic synchronizing signal from the second output of said range gating pulse generator providing a simultaneous synchronization of all the scan lines on said visual display means with the gating on of said amplifiers.

36. A method for providing a visual display of an object which may be undergoing motion and its internal acoustic heterogeneities by means of ultrasonic echo signals reflected therefrom and comprising the steps of generating periodic pulsed ultrasonic frequency pressure wave signals in a liquid medium sequentially from a plurality of acoustic transmitters oriented about an object being examined at various angles relative to the centerline axis of the apparatus, directing the periodic ultrasonic signals at the object, the orientation of the transmitters causing the signals to be directed at the object from a like plurality of directions, focussing ultrasonic echo signals periodically reflected from the object in response to the periodic generated ultrasonic signals incident thereon upon a single row of closely spaced simultaneously responsive acoustic detectors arranged along an axis perpendicular to the centnline axis of the apparatus, detecting on the single row of simultaneously responsive acoustic detectors the ultrasonic echo signals and converting the detected ultrasonic echo signals to electrical signals, periodically generating short duration electrical pulses for initiating the periodic operation of the transmitters and establishing a periodic zero reference time of operation of the apparatus, sequencing the operation of the transmitters in accordance with a particular logic, periodically gating on electrical signal amplifiers connected to outputs of the associated acoustic detectors at a first predetermined time after zero reference time in response to the periodic short duration electrical pulse wherein the gating on time corresponds to the range of the object being examined, periodically gating off the electrical signal amplifiers at a second predetermined time after the first time wherein the time interval between gating on and gating off corresponds to the depth of field in the object being examined to thereby obtain a time domain discrimination of the ultrasonic echo signals, supplying the amplified electrical signals to a visual display device, and supplying periodic sweep speed signals responsive to the sequencing of transmitter operation to a scan input of the visual display device, the sweep speeds being related to the angular orientation of the transmitters whereby each scan line of the visual display depicts superimposed echo signals detected by an associated acoustic detector with the depth of field defined by the time interval between gating on and off of the amplifiers, the repetition rate of operation of the apparatus and rate of display being sufficiently rapid to obtain a display representing a moving visualization in depth of a planar slice of the object being examined while it may be undergoing motion wherein the slice lies in a plane defined by the centerline axis of the apparatus and the axis of the single row of detectors, the echo signals detected as a result of the various angularly oriented transmitters substantially reducing resolution due to the effects of specular reflection off the object.

37. The method set forth in claim 36 and further comprising the steps of temporarily storing the amplified electrical signals prior to supplying them to the visual display device, and sequentially reading out the stored amplified electrical signals and serially supplying them to a single signal input of the visual display device which is of a serial input type, the periodic sweep speed signals supplied to the scan input of the visual display device providing synchronization of a line-by-line scan on thhe visual display device with the sequential reading out of the stored amplified electrical signals.

38. The method set forth in claim 36 wherein the step of supplying the amplified electrical44 signals to the visual display device consists of simultaneously supplying the outputs of the amplifiers to a plurality of signal inputs of the visual display device equal in number to the number of acoustic detectors In response to the gating on of the amplifiers, the periodic sweep speed signals supplied to the scan input of the visual display device which is of a parallel input type provides simultaneous synchronization of all the scan line on the visual display with the gating on of the amplifiers.

39. The method set forth in claim 36 and further comprising the step of increasing the resolution of the display on the visual display device along a vertical direction corresponding to the axis of the single row of acoustic detectors by more closely spacing of adjacent detectors, the limit of spacing being half a wavelength of the ultrasonic pressure wave signal in the liquid medium, and increasing the resolution of the display along a horizontal direction corresponding to the depth of field in the object being examined by utilizing a higher frequency of the ultrasonic frequency of excitation of the acoustic transmitter, the ultrasonic frequency being in a range of 1 to 10 megahertz.

* * * * *